US011359157B2

(12) United States Patent
Jia et al.

(10) Patent No.: US 11,359,157 B2
(45) Date of Patent: Jun. 14, 2022

(54) METHOD OF MAKING A GREASE THICKENER AND THE THICKENER MADE BY THE METHOD

(71) Applicant: DOW GLOBAL TECHNOLOGIES LLC, Midland, MI (US)

(72) Inventors: Zhe Jia, Lake Jackson, TX (US); John B. Cuthbert, Midland, MI (US); David L. Malotky, Midland, MI (US); Stacey A. Saba, Midland, MI (US); Bruce D. Hook, Lake Jackson, TX (US); Nathan Wilmot, Lake Jackson, TX (US); Daniel L. Dermody, Midland, MI (US)

(73) Assignee: DOW GLOBAL TECHNOLOGIES LLC, Midland, MI (US)

( * ) Notice: Subject to any disclaimer, the term of this patent is extended or adjusted under 35 U.S.C. 154(b) by 0 days.

(21) Appl. No.: 16/972,237

(22) PCT Filed: Jun. 27, 2019

(86) PCT No.: PCT/US2019/039512
  § 371 (c)(1),
  (2) Date: Dec. 4, 2020

(87) PCT Pub. No.: WO2020/006234
  PCT Pub. Date: Jan. 2, 2020

(65) Prior Publication Data
  US 2021/0324289 A1    Oct. 21, 2021

Related U.S. Application Data

(60) Provisional application No. 62/756,142, filed on Nov. 6, 2018, provisional application No. 62/691,206, filed on Jun. 28, 2018.

(51) Int. Cl.
  C10M 115/08    (2006.01)
  C08G 18/09     (2006.01)
  C08G 18/28     (2006.01)
  C08J 3/09      (2006.01)
  C10M 169/02    (2006.01)
  C10M 177/00    (2006.01)
  C10M 119/24    (2006.01)
  C10N 70/00     (2006.01)
  C08G 18/76     (2006.01)
  C10N 20/06     (2006.01)
  C10N 50/10     (2006.01)
  C10N 30/00     (2006.01)

(52) U.S. Cl.
  CPC ......... *C10M 115/08* (2013.01); *C08G 18/095* (2013.01); *C08G 18/2865* (2013.01); *C08J 3/092* (2013.01); *C10M 119/24* (2013.01); *C10M 169/02* (2013.01); *C10M 177/00* (2013.01); *C08G 18/7664* (2013.01); *C08J 2475/12* (2013.01); *C10M 2203/003* (2013.01); *C10M 2215/1026* (2013.01); *C10M 2215/24* (2013.01); *C10M 2217/0456* (2013.01); *C10N 2020/06* (2013.01); *C10N 2030/68* (2020.05); *C10N 2050/10* (2013.01); *C10N 2070/02* (2020.05)

(58) Field of Classification Search
  CPC .............. C10M 115/08; C10M 177/00; C10M 169/02; C10M 2215/1026; C10M 2215/24; C10M 2203/003; C10M 119/24; C10M 2217/0456; C08G 18/095; C08G 18/2865; C08G 18/7664; C08J 3/092; C08J 2475/12; C10N 2070/02; C10N 2020/06; C10N 2050/10; C10N 2030/68
  See application file for complete search history.

(56) References Cited

U.S. PATENT DOCUMENTS

| 2,710,840 | A  | 6/1955  | Swakon          |
| 5,539,021 | A  | 7/1996  | Pate et al.     |
| 7,837,957 | B2 | 11/2010 | Baum            |
| 7,923,421 | B2 | 4/2011  | Baum            |
| 8,985,840 | B2 | 3/2015  | Hester et al.   |
| 2006/0052261 | A1 | 3/2006 | Kray et al.     |
| 2016/0177214 | A1 | 6/2016 | Suetsugu        |
| 2017/0029735 | A1 | 2/2017 | Suetsugu        |
| 2017/0253826 | A1 | 9/2017 | Suetsugu et al. |
| 2018/0037842 | A1 | 2/2018 | Suetsugu et al. |

FOREIGN PATENT DOCUMENTS

| CN | 1754901 A    | 4/2006 |
| EP | 3150688 A1   | 4/2017 |
| JP | 2017115109 A | 6/2017 |

OTHER PUBLICATIONS

Search Report for the corresponding Chinese Application No. 201980035155.X, dated Mar. 7, 2021; 3 pages.
International Search Report for the corresponding International Application No. PCT/US2019/039512, International Filing Date: Jun. 27, 2019; dated Sep. 12, 2019; 5 pages.

(Continued)

*Primary Examiner* — Rabon A Sergent
(74) *Attorney, Agent, or Firm* — Cantor Colburn LLP

(57) ABSTRACT

A continuous process for producing a polyurea concentrate or powder. The process includes combing at least one amine and an isocyanate in the presence of a liquid diluent or a base oil in a rotor stator mixer. The concentrate comprises a polyurea in a base oil wherein the concentration of from about 20 weight percent to about 50, or 40 or 35 or 30 weight percent of polyurea based on total weight of grease thickener. The powder has particle size of 2 to 400 microns. This concentrate or powder can then be formulated by grease manufacturers to the desired final properties without the need for handling of the isocyanate and amine raw materials.

14 Claims, 1 Drawing Sheet

(56) References Cited

OTHER PUBLICATIONS

Written Opinion for the corresponding International Application No. PCT/US2019/039512, International Filing Date: Jun. 27, 2019; dated Sep. 12, 2019; 8 pages.
International Preliminary Report on Patentability for the corresponding International Application No. PCT/US2019/039512, International Filing Date: Jun. 27, 2019; dated Aug. 7, 2020; 15 pages.
Response and Amendments to the International Search Report and Written Opinion for the corresponding International Application No. PCT/US2019/039512; Response Filing Date: Mar. 18, 2020; 7 pages.

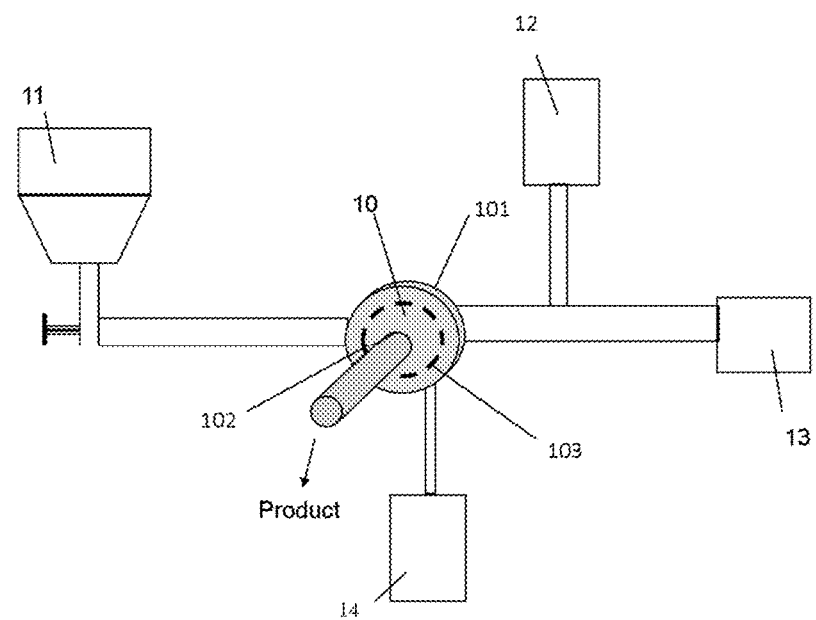

METHOD OF MAKING A GREASE THICKENER AND THE THICKENER MADE BY THE METHOD

CROSS-REFERENCE TO RELATED APPLICATIONS

This application is a 371 of PCT/US2019/039512, filed Jun. 27, 2019, which claims benefit of U.S. Application No. 62/691,206 filed on Jun. 28, 2018 and claims benefit of U.S. Application No. 62/756,142 filed on Nov. 6, 2018, all of which are incorporated by reference herein in their entirety.

FIELD OF THE INVENTION

The field of this invention is a continuous method of making a polyurea grease thickener and the thickener made by the process.

BACKGROUND

Industrial lubricating greases are homogeneous products of a semi-liquid to solid consistency. They essentially are a dispersion of a thickener in a liquid lubricant (a so-called base oil, base stock or carrier oil), which typically is a commercially available mineral oil or synthetic oil. The particular structure of lubricating greases is determined by the thickener, which is thus of primary importance to determining the technological properties of the grease product. There are various types of industrial greases.

Polyurea greases are among the most important advances in grease technology. They are known for unique high temperature capabilities, inherent anti-oxidative properties, and enhanced extreme pressure properties, making them preferred choice for fill-for-life applications including, for example, electric motor bearings and constant velocity joints. These non-soap greases are conventionally produced by an in situ reaction between isocyanates and amines in the presence of mineral or synthetic base oils. The resulting products do not contain any metallic elements, rendering the grease ashless. The automotive industry is the largest segment of the urea-thickened grease market. Polyurea grease production conventionally involve in situ reaction of isocyanates and amines in a lubricating base oil. Due to the nature of the reactants this can require specially designed facilities and/or exceptional ventilation systems. This has limited the adoption of polyurea greases due to complexity and cost of the manufacturing facilities.

SUMMARY OF THE INVENTION

The applicants have discovered a new continuous process for producing a polyurea grease thickener in concentrate or powder forms. This concentrate or powder can then be formulated by grease manufacturers to the desired final properties without the need for handling of the isocyanate and amine raw materials.

Thus, according to a first embodiment disclosed herein is a process comprising providing at least one amine and a base oil to a rotor stator mixer which is operating at a shear rate of less than 5000 reciprocal seconds (1/sec), adding a isocyanate to the mixer in the shear zone and in a position such that the residence time in the mixer after addition of the isocyanate is less than 20 seconds.

According to a second set of embodiments disclosed herein is a grease thickener concentrate which may be made by the above method and which comprises a polyurea in a base oil wherein the concentration of from about 20 weight percent to about 50, or 40 or 35 or 30 weight percent of polyurea based on total weight of grease thickener.

According to a third embodiment disclosed herein is a method for preparing a polyurea compound comprising reacting an amine and a polyisocyanate in the presence of a liquid diluent in a rotor stator mixing device in the presence of a liquid diluent under conditions sufficient to produce a dispersion of the polyurea compound in the liquid diluent. According to some embodiments the liquid diluent is removed to form a solid particulate product.

According to a fourth embodiment, disclosed herein is a method of formulating grease comprising providing a grease thickener (powder or concentrate) as described above and selected for use with a desired base grease oil and combining it with the base grease oil in ratios to achieve the desired grease performance results.

BRIEF DESCRIPTION OF THE DRAWINGS

FIG. 1 is a schematic of an example rotor stator mixer set up that may be used for the process disclosed herein.

DETAILED DESCRIPTION OF THE INVENTION

According to an aspect the process disclosed herein involves combining at least one amine and base oil in a rotor stator mixer at controlled shear and then adding an isocyanate into the shear zone and in a position to minimize residence time in the mixer. This process enables formation of a relatively high concentrate of polyurea grease thickener in the base oil. This approach enables a grease manufacturer to formulate its greases without the need for handling of isocyanates or amines.

According to an aspect the process disclosed herein involves combining at least one amine and an isocyanate in the presence of a liquid diluent in a rotor stator mixer under conditions to produce a dispersion of a polyurea in the liquid diluent. According to certain aspects the liquid diluent may be removed (e.g., by drying) to product a particulate form of the polyurea that can be used by a grease manufacturer as a thickener without the need for handling of isocyanates or amines.

The amines useful in the process may be include aliphatic, alicyclic, aromatic amines and mixtures thereof. Examples of amines include ethylene diamine, toluidine, chloroaniline, m-chloroaniline, melamine, dibenzimidazole diamine, ketone dicyclohexylamine, dicyclohexylamine, p-phenylene diamine, o-phenylene diamine, benzidine, pentylamine, hexylamine, heptylamine, octylamine, dodecylamine, cyclohexylamine, benzylamine, aniline, stearyl amine, other aliphatic amines such as tallow amines, and the like. Mixtures of amines may be employed. The amine may be a primary amine or a secondary amine, with primary amines being preferred. In one embodiment, the amine is a mixture of a fatty amine and a cycloalkyl amine. Examples of fatty amines include those saturated or unsaturated fatty amines having from 8 to 22 carbon atoms, including oleylamine, stearylamine, octylamine, dodecylamine, octadecylamine, etc. The ratio of fatty amine to cycloalkyl amine may be varied as desired to achieve the desired rheology. In one embodiment, the molar ratio of fatty amine moieties to cycloalkyl amine moieties is from 2:1 to 1:2. In one embodiment, the molar ratio of fatty amine moieties to cycloalkyl amine moieties is about 1:1, e.g. from 0.9:1 to 1.1:1. According to certain embodiments the amines are a mixture of two different linear primary amines having six to eighteen carbon atoms or a mixture of a linear primary amines having six to eighteen carbon atoms and a cyclic (e.g. cyclohexyl) primary amine.

Suitable isocyanates are selected from the group consisting of polyisocyanate, monoisocyanate, and diisocyanate, and any combination thereof. Preferably, a diisocyanate is used. Furthermore, the isocyanate component may be aliphatic or aromatic and preferably is selected from an aromatic diisocyanate or mixtures of aromatic diisocyanates. Examples of isocyanates include phenylene diisocyanate, 4,4'-diphenyl methane diisocyanate, 2,4-toluene diisocyanate, octadecyl isocyanate, phenyl isocyanate, 1,6 diisocyanate, 3,3'-dimethyl biphenyl-4,4'diisocyanate, polymethylene polyisocyanate and the like.

The base oil may be any known base oil for lubricants. Examples of base oils include API Groups I, II or III mineral oils, API Group IV polyalphaolefins (PAO), or Group V oils such as polyalkylene glycols like UCON™ fluids, or esters and other common lubricating base stock. The base stock can be used singularly or in combinations.

The components may be provided neat or in solution/dispersion to the rotor stator mixer. If provided in solution it is desirable to select the solvent from the base oil being used to make the grease. Desirably the solutions contain the reactant in concentrations of at least 20 or 30 or 40 or 50 or 60 or 70 or 80 or 90 weight percent.

An example of the reaction scheme for making the grease thickener or grease concentrate as disclosed herein is According to an embodiment, the polyurea product may be represented by the formula

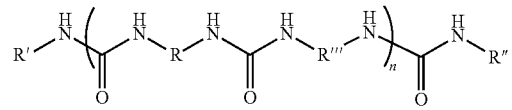

where n is an integer of from 1 to 3. R and R''' are divalent groups and may be the same or different, R and R''' a substituted or unsubstituted alkylene, arylene, aralkylene, most preferably having at least 1, or at least 2 carbon atoms, or at least 3 carbon atoms and preferably no more than 20, or no more than 15 carbon atoms. R' and R'' maybe the same or different, are monovalent groups, preferably, a substituted or unsubstituted alkyl, aryl, arylalkyl, most preferably having at least 1, more preferably at least 2, and preferably no more than 30 carbon atoms, and wherein the substitutent if any of R, R', R'', R''' are substituted may be additional hydrocarbyl groups.

The ratio of amine groups to isocyanate groups is preferably stoichiometric. However, in certain embodiments it can be advantageous to use a slight excess of amine groups to insure that the isocyanate groups have all reacted. Thus, according to one embodiment the ratio of amine groups to isocyanate groups is at least 1:1 and is up to 1.1:1, or 1.05:1 or 1.03:1.

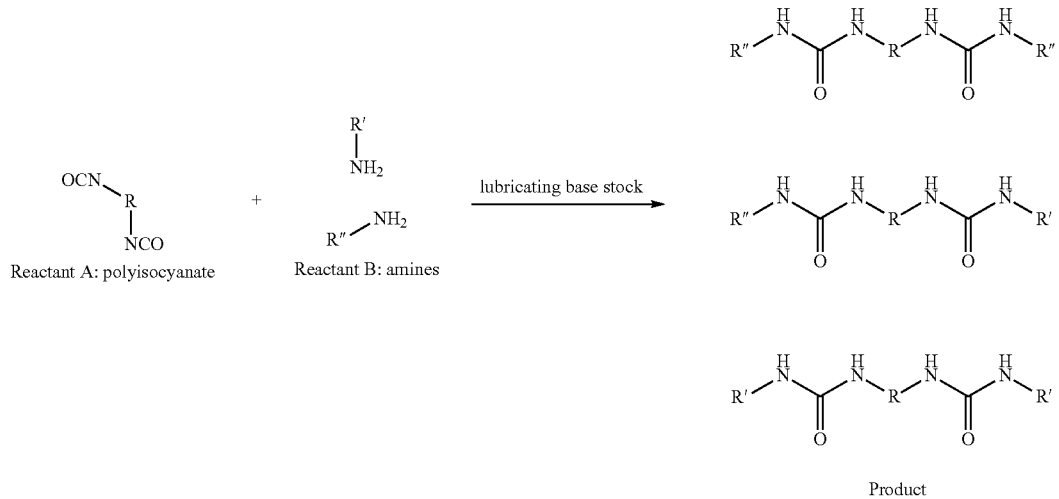

where R is a multivalent, preferably divalent group, preferably, a substituted or unsubstituted alkylene, arylene, aralkylene, most preferably having at least 1, or at least 2 carbon atoms, or at least 3 carbon atoms and preferably no more than 20, or no more than 15 carbon atoms, R' and R'' may be the same or different and are monovalent groups, preferably, a substituted or unsubstituted alkyl, aryl, arylalkyl, most preferably having at least 1, more preferably at least 2, and preferably no more than 30 or no more than 25 or no more than 22 carbon atoms, and wherein the substituent if any of R, R', R'' are substituted may be additional hydrocarbyl groups. Note that in one alternative, a higher multivalent group may be used for R, e.g. a trivalent group with three isocyanate groups, or a tetravalent group with four isocyanate groups, a branched product structure is formed. This is not shown in the reaction scheme above.

The ureas made may be diureas, tetraureas or other. Diureas are preferred.

FIG. 1 shows an example of a rotor stator mixer set up as made be used for this invention when two amines are being used as reactants. Feed sources 11, 12, and 13 may be used as means to provide the amines and base oil to the rotor stator mixer 10. A feed source may include temperature control as shown in feed source 11 where a jacketed tank is used for a fatty amine to prevent precipitation if it is provided in solution or dispersion form. These components are fed in to the front end or inboard 101 of rotor stator mixer 10. In contrast, the isocyanate source 14 is fed into the rotor stator mixer close to the outlet 102 and directly into the shear zone 103 to ensure quick reaction but to avoid too much shear heating.

Suitable rotor stator mixing equipment can be any one of a number of continuous inline mixers such as, for example, an Oakes rotor stator mixer, a Ross rotor stator mixer, or a Silverson rotor stator mixer. The rotations-per-minute (rpm) setting of the mixer can be used to help control the particle size of the dispersed phase in the product mixture, which has the texture of a paste.

The process of the present disclosure employs a continuous rotor stator mixer. Thus, in one embodiment, a first stream including an amine is supplied to a continuous rotor stator mixer from a suitable liquid pump for example, a syringe pump, gear pump, or progressive cavity pump. The first stream continuously passes through a first conduit and is fed to a location near the outside of the diameter of the rotor stator mixer. A second stream including a diisocyanate is supplied to the continuous rotor stator mixer through a second conduit and is fed to a location near the inside of the diameter of the rotor stator mixer. The flow rates of the streams are adjusted to achieve the desired stoichiometry to enable the formation of the desired polyurea.

In one embodiment, separate inlet ports are provided to feed the isocyanate feed stream and the amine feed stream to the mixer. In one embodiment, the isocyanate is fed towards the radial center effluent location of the mixer, while the amine is fed more towards the radial outside of the mixer.

The agitator in the rotor stator mixer may be any known shape or configuration but according to one embodiment is concentric rings of teeth. The mixer (reactor) may be jacketed for temperature control. Since the reaction is exothermic a fluid controlled jacket is desirable to keep the temperature down. A nitrogen purge may be used to avoid exposure of the reactants and reaction to oxygen. According to one embodiment the temperature of the mixture is from 40 to 70° C. In certain aspects where a liquid diluent is used a broader temperature range may be feasible such as for example −100 or 20 or 40° C. to 250 or 200 or 190° C.

According to one embodiment the shear rate is at least 500 1/sec, or 600 1/sec, or 700 1/sec and is no more than 5000 1/sec, or no more than 2000 1/sec, or no more than 1500 1/sec. The isocyanate is introduced directly to the shear zone and near the outlet of the rotor stator mixer. According to certain embodiments the isocyanate is introduced at a location such that its residence time (i.e. the residence time for the isocyanate or its reaction product) is no more than 20 seconds, or no more than 15 seconds or no more than 10 second, or no more than 5 seconds but is at least 0.1 second, or 0.5 seconds, or 1 second, or 2 seconds. Alternatively, the residence time for the isocyanate component (or its reaction product) is less than the residence time for the other components added to the mixture. As another alternative, the physical distance of the port for introducing the isocyanate to the rotor stator mixer is no more than half the diameter of the mixer distance from the outlet. For example, on a ten inch (25 cm) diameter mixer, the port is less than 5 inches (12.5 cm) or less than 4 inches (about 10 cm) from the outlet port.

According to certain embodiment, grease concentrates so made preferably have at least 20 weight percent or at least 25 weight percent and no more than 40 weight percent or no more than 35 weight percent or no more than 30 weight percent polyurea based on total weight of the concentrate (generally urea and base oil).

The grease concentrate is advantageous in that it may be stored and shipped and then used when desired by a grease manufacturer to make their desired grease formulations. In formulating the grease, the concentrate may be diluted with one or more additional base oil. Examples of oils that may be used as the additional base oils are API Groups I, II or III mineral oils, API Group IV polyalphaolefins (PAO), or Group V oils such as polyalkylene glycols like UCON™ fluids, or esters and other common lubricating base stock. The additional base oil may be the same as the base oil in the concentrate. Alternatively, the additional base oil may be different from the base oil in the concentrate. The dilution preferably occurs while mixing. Heating is not needed for this step but may be used as desired. If heating is used suitable temperatures are more than room temperature or at least 50° C. or at least 100° C. but no more than 200° C. Additives may be included in the formulated grease as desired. Examples of such additives are antioxidants; anti-wear compounds; extreme pressure compounds, rust and corrosion inhibitors; tackifiers; detergents; dispersants; anti-foaming additives; and mixtures thereof.

According to certain aspects the polyurea is prepared using a liquid diluent. The liquid diluent employed in the practice of the present disclosure advantageously is one that is inert to the amines and/or isocyanates and optionally is compatible with the components of any end product to be formed from the polyurea. It is preferred that the amine or polyisocyanate be readily soluble in the diluent. In general, it is preferred to dissolve the amine in the liquid diluent. In one embodiment, base oils or carbon-based solvents that are compatible with the amine and/or isocyanate can be used as a liquid diluent. The amount of diluent used is not particularly critical and will depend to a certain extent upon the solubility of the reactant, e.g., the amine in the diluent. The amount of liquid diluent employed is an amount that is sufficient to dissolve or disperse the pertinent reactant. Indeed, in the process of this disclosure, it is preferred to dissolve the amine in the diluent. Again, the diluent is not subjected to just amine alone but can be combined with the isocyanate. At least sufficient diluent is used to dissolve or disperse the amine. In one embodiment, the amount of diluent will be sufficient to provide a solution having about the same density as that of the isocyanate or diluent combination. In one embodiment, the liquid diluent is removed from the polyurea/diluent paste that exits the mixing zone.

The liquid diluent employed is preferably chosen from organic solvents. As used herein, the term liquid diluent means in particular a compound, in particular a dispersing agent that is liquid at room temperature (20° C.). The liquid diluent is preferably selected from organic solvents that are chosen from the group consisting of optionally substituted straight-chain, branched or cyclic aliphatic or aromatic hydrocarbons. Substituents can be, in particular, oxygen- and/or halogen-containing functional groups, such as chlorine, a carbonyl group, an ester group, an ether group etc. Examples of the liquid diluent include: dioxane, n-hexane, cyclohexane, n-heptane, n-octane, isooctane, benzene, toluene, xylene, halogenated hydrocarbons, such as methylene chloride and chlorobenzene, ethers, such as diethyl ether, tetrahydrofuran and petroleum ether, ketones, such as acetone, and 2-butanone, esters, such as ethyl acetate and butyl acetate, and end-capped glycol ethers such as dipropylene glycol dimethyl ether, diglyme. etc. Mixtures of liquid diluents may be employed.

In certain aspects, the liquid diluent is a base oil or comprises a base oil.

The liquid diluent level may vary depending on the processing conditions in the reaction mixer and subsequent drying operations. Initial liquid diluent levels may be as high as 99 wt. %, preferably at or below 90 wt. %, more preferably at or below 80 wt. %, even more preferably at or below 75 wt. %, sometimes preferably at or below 65 wt. % liquid diluent, based on the total weight of reactants and liquid diluent. The most desirable level of liquid diluent is dependent on solvent properties such as vapor pressure, solubility of the reactants and the product, flammability, and the ability to easily dry the liquid diluent from the product to desirably low levels.

In one embodiment, a drying step, where the liquid diluent is removed from the particles in a way that reduces or minimizes particle agglomeration, is employed. This advantageously is done in an agitated and heated dryer, preferably with a dryer having the capacity to vent the vaporized liquid diluent out of the dryer to an external condenser. Examples of dryers include paddle dryers, plowshare dryers, Nauta mixers, V-blenders, ribbon blenders, rotary drum dryers, fluidized bed dryers and the like. Preferably, the drying is done under vacuum to enhance the drying rate of the powder and reduce process cycle time. Thus, in one embodiment, the process includes drying the dispersion, and recovering the polyurea as a solid, particulate product. In one embodiment, the solid, particulate polyurea product comprises less than 0.5 wt. % liquid diluent, based on the weight of the polyurea and the liquid diluent. In one embodiment, the average dryer powder bed temperature is below 140° C. In one embodiment, the average dryer powder bed temperature is below 160° C. In one embodiment, the average dryer powder bed temperature is below 200° C. In one embodiment, the liquid diluent is recycled and reused for further production of the polyurea. Quiescent dryers such as tray dryers, flakers or pastillators may also be used, however the resulting product may require further grinding in order to reach an appropriate particle size. In those embodiments where the liquid diluent level is at least 90 wt. %, spray drying may be utilized as a means of removing the liquid diluent from the final dried powder product particles.

According to an aspect, the particle size of the polyurea in the dispersion or paste advantageously is from 2 to 400 micron (μm), or 5 to 300 micron, or 5 to 200 micron as measured by laser light scattering or optical light obscuration. In one embodiment, the dispersion samples are diluted and average particle size is characterized by laser light scattering on a Beckman Coulter LS 13 320 particle sizing analyzer with a microliquid module.

The dried powder can be formulated with the base oils to get the desired viscosity in the final lubricating oil. For example, a grease or lubricating oil can be prepared by mixing a base lubricating oil and a polyurea powder prepared by the process of the disclosure to form a mixture; heating the mixture to a temperature in the range of from 150° C. to 175° C.; and thereafter milling the heated mixture to form a homogenized grease.

In one embodiment, the grease is a polyurea grease comprising a base oil and polyurea particles. The particles have an average particle size of from 10 microns to less than 700 microns, a density of less than 6.5 lbs./gal, and a specific surface area of less than 1 m2/g.

EXAMPLES

Example 1—Preparation of Grease Thickener Concentrate

ISONATE™ 125M pure 4,4'-diphenyl methane diisocyanate (MDI) was obtained from The Dow Chemical Company. Armeen™ HTM-97 (hydrogenated tallow amine) was obtained from AkzoNobel. Cyclohexyl amine was obtained from Aldrich or Fisher. ExxonMobil EHC 120 Group II base oil was obtained from ExxonMobil. All reactants were used as received without further treatment.

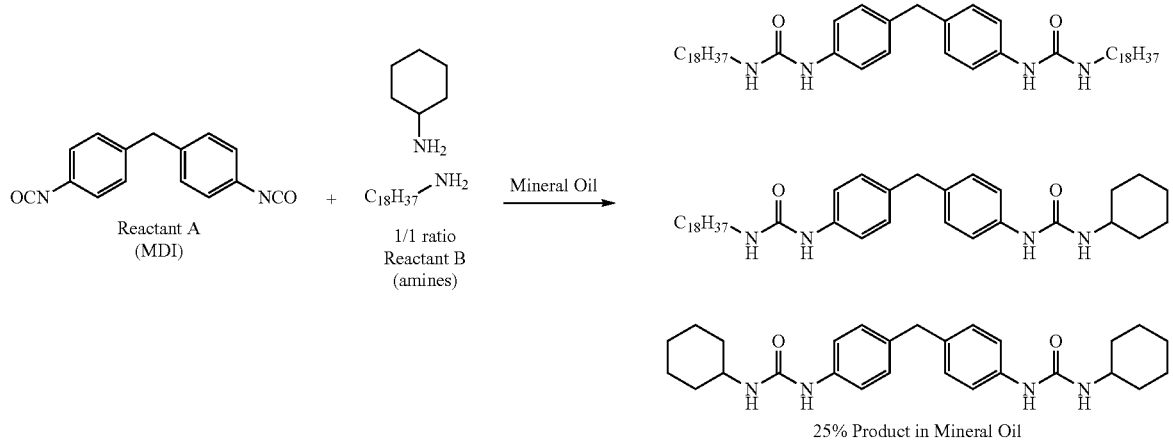

All reactants were delivered separately to a 4" rotor stator E.T. Oakes continuous mixer (Model 4MHOA) missing every other tooth on both sides spinning at 500 rpm using Teledyne Isco syringe pumps. EHC 120 was used as the common solvent for all reactants. Mass flowrates were converted into volumetric flowrates for delivery from the Isco syringe pumps. The fatty amine, Armeen HTM-97, was prepared as a 50 wt % solution in EHC 120 (solution density=0.85 g/mL) and stored at 60° C. in a jacketed feed tank to prevent precipitation of the amine. It was then loaded into a 1000 mL Isco syringe pump equipped with a heater jacket at 60° C. The solution was fed through a heated line at 60° C. and delivered to the mixer on the inboard side (closest to the motor). A pure stream of cyclohexylamine (density 0.867 g/mL) was loaded into a 500 mL Isco syringe pump. A 100 wt % pure base oil feed was loaded into a pair of Isco syringe pumps, 500 mL each. The cyclohexylamine feed was combined with the pure solvent feed and delivered to the inboard side of the mixer over the shaft opposite the fatty amine. The melted Isonate 125M Pure MDI (density 1.2 g/mL) was prepared and loaded into a 500 mL Isco syringe pump at 60° C. The MDI was delivered into the outboard side of the mixer, farthest from the motor, on the second-to-last row which is near the outlet resulting in residence time for the MDI or its product of about 4 seconds. Throughout the process, the mixer head was held at 50° C. The dispersion exited the system on the outboard side of the mixer, without any check valves, and was collected. The process pressure was monitored on the inboard side of the mixer on the cyclohexylamine Isco and on the fatty amine feed line. The process temperature was monitored with a thermocouple at the mixer outlet.

Individual NESLAB RTE 211 circulating baths were utilized to heat the jacket of the tank and the head of the 4" E.T. Oakes emulsification mixer (model #4MBHOA). The Teledyne Isco syringe pump (Model 500D), the line between the tank and the 1000D Isco and the line between the 500D Isco and 4" E.T. Oakes mixer were heated by wrapping silicone heat tapes around the Isco cylinder and feed lines. The heat tapes were controlled using a control panel with multiple temperature controllers. Additionally a Milton Roy Pump (Model #5CBM4CCNNSE) was used to maintain back pressure on the seals of the 4" E.T. Oakes mixer.

The resultant grease concentrate had a concentration of 25 wt % of the diurea products in the base oil based on total weight of the concentrate.

Example 2—the Preparation of Polyurea Grease from Preformed Grease Thickener Concentrate The grease was made using a 1 L glass jacketed controlled temperature mixer with a glass lid. A metal anchor shaped agitator with a variable speed drive was used to mix the grease. A temperature controlled circulating bath with Dow Corning 550 fluid was used to control the temperature of the glass jacketed controlled temperature mixer. A nitrogen purge was used to keep the headspace of the glass jacketed controlled temperature mixer free of oxygen.

Grease was made from a paste produced in the method described above that was 25 wt % urea and 75 wt % EHC 120. 246.2 g of urea paste was added to glass jacketed controlled temperature mixer. 246.5 g of EHC 120 was then added to the glass jacketed controlled temperature mixer and the glass jacketed controlled temperature mixer was sealed. The components were allowed to sit in the glass jacketed controlled temperature mixer for 30 m to allow the base oil to soften the paste. After 30 minutes the agitator was started at 150 rpm, the nitrogen purge was turned on, and the circulating bath started with the bath temperature set to 160° C. The contents were stirred at 160° C. for ~4 hours. After 4 hrs the bath temperature was increased to 180° C. while the agitation speed was maintained at 150 rpm. The contents were stirred for 30 m once the glass jacketed controlled temperature mixer temperature reached 180° C. After 30 m at 180° C., the bath temperature was reduced to 50° C. and the agitation stopped. The glass jacketed controlled temperature mixer was allowed to sit at 50° C. overnight. The contents of the glass jacketed controlled temperature mixer were removed and put through an EXAKT 3 Roll Mill 50i three times through and tested for penetration with an Anton-Paar PNR 12 penetrometer, according to ASTM D217 Test Methods for Cone Penetration of Lubricating Grease. The consistency measured a 223 after 60 round trip strokes in a grease worker, which corresponds to an NLGI Grade 3 grease. The grease was sheared for 100K strokes in a grease worker to determine shear stability. The consistency was measured at 204 after 100000 strokes. The dropping point of the grease was measured by ASTM D2265 and found to be >260° C. These results demonstrate the efficacy of the urea compound as a preformed polyurea thickener.

Example 3—Preparation of Pre-Formed Thickener Powder

The following raw materials are employed. ISONATE 125M Pure MDI brand MDI is a pure, crystalline MDI mixture obtained from The Dow Chemical Company. Armeen® TM-97 (stearyl amine) is obtained from AkzoNobel. Cyclohexylamine is obtained from Aldrich. PROGLYDE DMM brand dipropylene glycol dimethyl ether is obtained from The Dow Chemical Company. All reactants are used as received without further treatment. The reaction of MDI with cyclohexylamine and stearyl amine is conducted in the PROGLYDE DMM liquid diluent as follows. All reactants are continuously delivered separately to a 4" rotor stator E.T. Oakes continuous mixer (Model 4MHOA), which has been modified so that it is missing every other tooth on both sides, using Teledyne Isco 500 mL (Model 500D) syringe pumps. PROGLYDE DMM is used as the common liquid diluent for all reactants. Mass flow rates are converted into volumetric flow rates for delivery from the Isco syringe pumps. The fatty amine, Armeen HTM-97, is prepared in advance as a 20 wt. % solution (solution density=0.887 g/mL) and the solution is stored at 60° C. in a jacketed feed tank to prevent precipitation of the amine. The fatty amine solution is then loaded into a 500 mL Isco syringe pump equipped with a heater jacket at 60° C. The solution is fed through a heated line at 50° C. and is delivered to the mixer on the inboard side (closest to the motor). A 20 wt. % solution of cyclohexylamine (solution density 0.946=g/mL) is loaded into a 500 mL Isco syringe pump. A 100 wt. % pure liquid diluent feed is loaded into a pair of Isco syringe pumps connected to an air actuated manifold for continuous operation. The cyclohexylamine feed is tee'd with the pure liquid diluent feed and delivered to the inboard side of the mixer over the shaft opposite the fatty amine. A 50 wt. % solution of ISONATE 125M Pure MDI (solution density 1.05 g/mL) is prepared and loaded into a 500 mL Isco syringe pump. The MDI is delivered into the outboard side of the mixer, farthest from the motor, on the second-to-last row. Throughout the process, the mixer head is held at 40° C. A dispersion exits on the outboard side of the mixer, without any check valves, and is collected. The process pressure is monitored on the inboard side of the mixer on the cyclohexylamine Isco pump and on the fatty amine feed line, and is less than 100 psig. The shear rate in the mixer is calculated to be 1400-1800 s-1 and the residence time of the dispersion is 2.3 s. The process temperature is monitored with a thermocouple at the mixer outlet. Individual NESLAB RTE 211 circulating baths are utilized to heat the jacket of the tank and the head of the mixer. The Teledyne Isco syringe pump (Model 500D), the line between the tank and the pump and the line between the pump and the mixer are heated by wrapping silicone heat tapes around the pump cylinder and feed lines. The heat tapes are controlled using a control panel with multiple temperature controllers. Additionally, a Milton Roy Pump (Model #5CBM4CCNNSE) is used to maintain back pressure on the seals of the mixer. The product leaving the mixer is a paste and is a dispersion of the polyurea reaction product in the liquid diluent. In one embodiment, the dispersion comprises at least 20% wt. polyurea based on the weight of the dispersion.

The product is pushed from the rotor stator mixer by the reactants/liquid diluent being pumped into the rotor stator mixer through a pipe (tube) tilted at an angle from the rotor/stator exit at such an angle that air is excluded from the rotor/stator. The product is discharged into a suitable container where it is collected and stored until it is dried. 6.4 kilograms of the product paste (25% solids) is loaded into a 22 liter plow mixer equipped with a hot oil heat transfer jacket, a 5 hp motor and full scraping blades in the center with half-plow blades with head scrapers at the front and back of the agitator shaft. The plow mixer also contains a chopper fitted with a "2x" set of blades driven by a 2 hp motor. Vacuum is supplied with a 2 stage liquid-ring vacuum pump and a low level nitrogen sweep is introduced to the headspace of the mixer, below the filter.

After loading the paste, the dryer is sealed and the vacuum is connected. The hot oil on the jacket is recirculated at 140° C. and the plows are started at 110 rpm, increasing to 165 rpm when overhead condensation is observed to begin (~45 min). As the bed temperature rises to 200° C., the liquid diluent appears to be driven overhead and is collected in the condenser.

After the overhead condensation is no longer observed, the bed temperature rises to 225±3° C. where it is held for 2 hours. Soon after reaching 225° C., the chopper is engaged at full speed (3400 rpm) for 10 minutes, and then turned off for the rest of the trial.

After holding the temperature at approximately 225° C. for two hours, the hot oil is cooled to ambient temperature and the dryer bed likewise is cooled over an hour to less than 50° C. At this point the dryer bed is opened and emptied to collect the remaining powder. 1.4 kg of remaining powder is collected from the dryer, and 0.2 kg is from fines in the filter.

Example 4—Preparation of Grease Using Powder Thickener

A 1 L glass jacketed reactor is used to prepare the grease. The reactor is equipped with a glass lid, a metal agitation shaft and a nitrogen purge, and is heated by a silicone fluid circulating bath. Approximately 430 grams of Exxon Mobil EHC-120, a heavy neutral Group II base stock, is added to the reactor. The agitation rate is set to 150 RPM, the bath temperature is set to 80° C. and a nitrogen purge is started. Once the temperature of the Exxon Mobil EHC-120 reaches 80° C., approximately 61.5 grams (12.5 wt. %) of the polyurea powder of Ex. 1 is added to form a mixture. The agitation speed is then increased to 250 RPM. The temperature of the mixture is increased to 160° C. After one hour at 160 C, the agitation speed is reduced to 150 rpm. After an additional hour, the temperature of the mixture is increased to 180° C. After 90 minutes at 180° C. the agitator is stopped and the polyurea/Exxon Mobil EHC-120 mixture is cooled to 50° C. Once the polyurea/Exxon Mobil EHC-120 mixture reaches 50 C, the polyurea/Exxon Mobil EHC-120 mixture is removed from the reactor. The polyurea/Exxon Mobil EHC-120 mixture is then homogenized to form a grease. The grease is put through an EXAKT 3 Roll Mill 50i three times. The milled grease is then tested for penetration using an Anton-Paar PNR 12 penetrometer, according to ASTM D217 Test Methods for Cone Penetration of Lubricating Grease. The consistency measures a 256, which is between an NLGI grade 2 and an NLGI grade 3. This result demonstrates the efficacy of the polyurea as a preformed polyurea thickener.

The powder generated from the process of the disclosure performs better as to:
a) higher thickening efficiency and b) enhanced shear stability.

What is claimed is:

1. A process comprising feeding at least one amine and a first base oil to a front end of a rotor stator mixer which is operating at a shear rate of less than 5000 reciprocal seconds (1/sec), adding an isocyanate to the mixer in a shear zone of the rotor stator mixer and in a position located at a distance from an outlet of the rotor stator mixer that is no more than half the diameter of the rotor stator mixer such that a residence time in the mixer after addition of the isocyanate is less than 20 seconds to produce a grease thickener concentrate comprising a polyurea.

2. The process of claim 1 characterized in that the process is continuous.

3. The process of claim 1 wherein the at least one amine is a mixture
   comprising a first linear primary amines having six to eighteen carbon atoms and either a second linear primary amines having six to eighteen carbon atoms and being different from the first linear primary amine or a cyclic primary amine.

4. The process of claim 1 wherein the residence time is less than 10 seconds.

5. The process of claim 1 wherein the residence time is less than 5 seconds.

6. The process of claim 1 wherein the at least one amine is a primary amine and the isocyanate is a di-isocyanate such that the polyurea formed is a diurea.

7. The process of claim 1 wherein the at least one amine comprises an alkylamine and a fatty amine.

8. The process of claim 1 wherein the grease thickener concentrate comprises at least 20 weight percent of the polyurea based on total weight of the grease thickener concentrate.

9. The process of claim 1 wherein the first base oil is selected from API Groups I, II, III, IV or V.

10. The process of claim 1 further comprising diluting the grease thickener concentrate with a second base oil and adding an additive selected from antioxidants; antiwear compounds; extreme pressure compounds, rust and corrosion inhibitors; tackifiers; detergents; dispersants; antifoaming additives; and combinations thereof to form a grease.

11. The process of claim 10 wherein the second base oil is the same as the first base oil.

12. A process comprising reacting an amine and a polyisocyanate in the presence of a liquid diluent in a rotor stator mixer under conditions sufficient to produce a dispersion of a polyurea compound in the liquid diluent wherein the amine is fed to the rotor stator mixer at a front end of the mixer and the polyisocyanate is fed to the rotor stator mixer at a distance that is no more than half the diameter of the rotor stator mixer from an outlet of the rotor stator mixer and directly into a shear zone of the rotor stator mixer to form a polyurea.

13. The process of claim 12 further comprising recovering the polyurea in a dry,
   solid particulate form having average particle size of 2 to 400 microns.

14. The process of claim 13 further comprising mixing a base lubricating oil and the dry solid particulate form of the polyurea to form a mixture; heating the mixture to a temperature in the range of from 150° C. to 180° C.; and thereafter milling the heated mixture to form a homogenized grease.

* * * * *